Patented Mar. 30, 1948

2,438,807

UNITED STATES PATENT OFFICE 2,438,807

2-CARBALKOXY-3-KETO-TETRAHYDROTHI-OPHENE PRODUCT AND PROCESS

Paul Karrer, Zurich, Switzerland, assignor to Hoffmann-La Roche Inc., Nutley, N. J., a corporation of New Jersey No Drawing. Application March 22, 1943, Serial No. 480,091. In Switzerland May 5, 1942

4 Claims. (Cl. 260—329)

It has been found that thiophan-3-one can be manufactured by esterifying sulfide-acetic-acid-$\beta$-propionic-acid (thioglycol-hydracrylic acid), condensing the ester in presence of a condensing agent to thiophanone-(3)-carboxylic acid ester, saponifying the latter and transforming the free keto-carboxylic acid by decarboxylation into thiophan-3-one.

The sulfide-acetic-acid-$\beta$-propionic-acid (Formula I) can be obtained according to the indication in Berichte der Deutschen Chemischen Gesellschaft, vol. 29, year 1896, page 1140, and vol. 67, year 1934, page 757. During the condensation of the ester, whereby, for instance, sodium alcoholate may be used as condensing agent, a mixture of the two keto-acid esters of the Formulae II and III is formed. By saponification and decarboxylation both these compounds yield thiophan-3-one of the Formula IV.

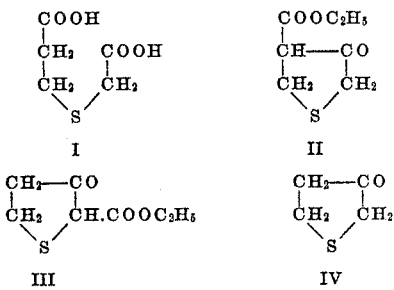

The thiophan-3-one is to be used as an intermediate product for the manufacture of pharmaceutical preparations.

Example 1

A solution of 20 parts by weight of sulfide-acetic-acid-$\beta$-propionic-acid ethyl ester in 70 parts by volume of dry ether is added to 4 parts by weight of dry sodium ethylate while cooling. The mixture is stirred for 6 hours at low temperature and then allowed to stand overnight at room temperature. The reaction mixture is decomposed by careful addition of ice and acetic acid, the ether layer is separated off, the water-layer is shaken with ether once more, whereupon the united ether extracts are dried. Now, the ether solution is shaken out several times with small quantities of cold, 5% sodium hydroxide solution, whereby the keto-carboxylic esters are dissolved as enolates. The alkaline extracts are at once allowed to flow into a mixture of ice and acetic acid. The keto-carboxylic acid esters precipitating hereby may again be extracted with ether.

After evaporation of these ether extracts the residue is hydrolised in alkaline medium. After acidifying, the free keto-carboxylic acids are extracted from the reaction mixture by ether. The solvent is driven off, the residue distilled, whereby thiophan-3-one, a clear oil boiling at 175° C. is obtained. The semicarbazone shows a melting point of 192° C.

Example 2

At a temperature of 25–30° C. a solution of 10 parts by weight of sulfide-acetic-acid-$\beta$-propionic-acid diethyl ester in 50 parts by volume of ether is added slowly, drop by drop, to a suspension of 3.6 parts by weight of powdered sodium amide in 50 parts by volume of dry ether while stirring continuously and excluding moisture. The violence of the reaction is moderated by cooling. The mixture is further agitated at 35° C. for 6 hours and then poured on to a mixture of ice with 6 parts by volume of glacial acetic acid. The liquid is saturated with sodium chloride and extracted with ether. The ether solution is washed with bicarbonate and water and upon distilling off the solvent leaves behind the thiophanone-(3)-carboxylic acid ethyl ester as an oil, distilling constantly at 124–126° C. at 11 mm. pressure. The yield is over 70%. The further handling of the ester is the same as in Example 1.

Example 3

Amorphous sodium ethylate, prepared from 2.1 parts by weight of sodium, is covered with a layer of 30 parts by volume of toluene. To this suspension a solution of 10 parts by weight of sulfide-acetic-acid-$\beta$-propionic-acid diethyl ester in 80 parts by volume of toluene is added drop by drop at a temperature of 18° C. while stirring mechanically and excluding moisture. There occurs a raise of temperature and the reaction mass partly solidifies. Stirring at 40–50° C. is continued for 5 hours, whereupon the reaction mixture is decomposed with ice and 12 parts by volume of glacial acetic acid, saturated with sodium chloride and extracted with ether. After washing the ether layer and evaporating the solvent, the thiophanone-(3)-carboxylic acid ethyl ester is distilled. Boiling point 123-126° C. under 11 mm. pressure. The decarboxylation takes place as described in Example 1.

I claim:

1. A process for the manufacture of heterocyclic sulphur compounds of the general formula:

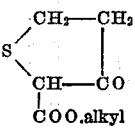

which comprises treating dibasic acid esters of the general formula:

$$R_1OOC.CH_2.S.CH_2.CH_2.COOR_2$$

where $R_1$ and $R_2$ are alkyl groups with alkaline condensing agents to bring about ring closure with elimination of an alcohol $R_2OH$.

2. A tetrahydrothiophene compound represented by the following formula

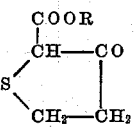

where R represents a lower alkyl group.

3. A compound represented by the following formula

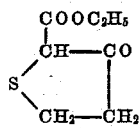

4. A process for the manufacture of heterocyclic sulphur compounds of the general formula

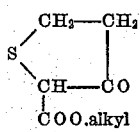

which comprises treating dibasic acid esters of the general formula:

$$R_1OOC.CH_2.S.CH_2.CH_2COOR_2$$

where $R_1$ and $R_2$ are alkyl groups with sodium ethylate to bring about ring closure with elimination of an alcohol $R_2OH$.

PAUL KARRER.